(12) United States Patent
Trimby

(10) Patent No.: US 10,873,607 B1
(45) Date of Patent: *Dec. 22, 2020

(54) LOGICAL NETWORK ABSTRACTION FOR NETWORK ACCESS CONTROL

(71) Applicant: Fortinet, Inc., Sunnyvale, CA (US)

(72) Inventor: Bradley J. Trimby, Concord, NH (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/902,791

(22) Filed: Jun. 16, 2020

Related U.S. Application Data

(63) Continuation of application No. 16/153,951, filed on Oct. 8, 2018.

(60) Provisional application No. 62/738,923, filed on Sep. 28, 2018.

(51) Int. Cl.
H04L 29/06 (2006.01)

(52) U.S. Cl.
CPC .......... *H04L 63/20* (2013.01); *H04L 63/0884* (2013.01)

(58) Field of Classification Search
CPC .......................... H04L 63/20; H04L 63/0884
See application file for complete search history.

(56) References Cited

U.S. PATENT DOCUMENTS

| | | | |
|---|---|---|---|
| 6,098,116 A | 8/2000 | Nixon et al. | |
| 6,389,464 B1 | 5/2002 | Krishnamurthy et al. | |
| 7,515,546 B2 | 4/2009 | Gaspard et al. | |
| 7,580,936 B2 | 8/2009 | Salgado | |
| 7,770,217 B2 | 8/2010 | Pueblas | |
| 8,205,251 B2 * | 6/2012 | Crawford | H04L 63/0236 726/11 |
| 9,210,193 B2 | 12/2015 | Nedbal et al. | |
| 9,461,980 B1 | 10/2016 | Agrawal et al. | |
| 2008/0126557 A1 | 5/2008 | Motoyama et al. | |
| 2008/0222285 A1 | 9/2008 | Hickey et al. | |
| 2009/0254392 A1 | 10/2009 | Zander | |
| 2009/0307753 A1 | 12/2009 | Dupont et al. | |

(Continued)

OTHER PUBLICATIONS

Non-Final Office Action for U.S. Appl. No. 16/153,951, dated May 15, 2020, 14 pages.

(Continued)

*Primary Examiner* — Oleg Korsak
(74) *Attorney, Agent, or Firm* — Jaffery Watson Mendonsa & Hamilton LLP

(57) ABSTRACT

Systems and methods for NAC access policy creation and reconfiguration of access points to enforce same are provided. According to one embodiment, access policies are decoupled from underlying implementation details of access points by: (i) maintaining by a NAC device an access point model that maps logical networks to corresponding enforcement action implementations for the access points; and (ii) representing the access policies in a form of a current state of a particular endpoint device and an enforcement action specified with reference to a logical network. An attribute of an endpoint is received by the NAC device based upon which a matching access policy is identified. The corresponding enforcement action implementation for the access point to which the endpoint is connected is retrieved based on the logical network specified in the matching access policy and is used to reconfigure the access point to perform the enforcement action.

30 Claims, 12 Drawing Sheets

(56) References Cited

U.S. PATENT DOCUMENTS

| | | | |
|---|---|---|---|
| 2011/0213869 A1* | 9/2011 | Korsunsky | H04L 63/1483 |
| | | | 709/223 |
| 2011/0214157 A1* | 9/2011 | Korsunsky | H04L 63/1441 |
| | | | 726/1 |
| 2012/0040690 A1 | 2/2012 | Zhao et al. | |
| 2012/0117622 A1 | 5/2012 | Gronholm et al. | |
| 2012/0240185 A1* | 9/2012 | Kapoor | H04L 41/0866 |
| | | | 726/1 |
| 2013/0145000 A1 | 6/2013 | Meyer et al. | |
| 2013/0332982 A1 | 12/2013 | Rao et al. | |
| 2016/0119379 A1* | 4/2016 | Nadkarni | G06F 21/6245 |
| | | | 726/1 |
| 2016/0191413 A1* | 6/2016 | Feroz | H04L 63/0281 |
| | | | 709/229 |
| 2016/0344773 A1 | 11/2016 | Knjazihhin et al. | |
| 2018/0295036 A1* | 10/2018 | Krishnamurthy | G06F 9/45558 |
| 2019/0052659 A1 | 12/2019 | Weingarten et al. | |
| 2020/0007582 A1* | 1/2020 | Dixit | H04L 41/22 |
| 2020/0007583 A1* | 1/2020 | Dixit | H04L 63/20 |
| 2020/0007584 A1* | 1/2020 | Dixit | H04L 41/0893 |
| 2020/0106782 A1* | 4/2020 | Sion | H04L 67/10 |

OTHER PUBLICATIONS

Non-Final Office Action for U.S. Appl. No. 16/154,838, dated Apr. 3, 2020, 29 pages.

* cited by examiner

| NAME 302 | WHERE (LOCATION) 304 | WHO/WHAT BY GROUP 306 | WHO/WHAT BY ATTRIBUTE 308 | WHEN 310 | LAST MODIFIED BY 312 | LAST MODIFIED DATE 314 |
|---|---|---|---|---|---|---|
| EMPLOYEE-WIRED-BURNABY | WIRED-BURNABY | EMPLOYEE | No | ALWAYS | ADMIN | 09/13/18 03:51 PM EDT |
| EMPLOYEE-WIRED-CONCORD | WIRED-CONCORD | EMPLOYEE | No | ALWAYS | ADMIN | 09/13/18 03:51 PM EDT |
| EMPLOYEE-WIRED-SUNNYVALE | WIRED-SUNNYVALE | EMPLOYEE | No | ALWAYS | ADMIN | 09/13/18 03:50 PM EDT |
| MIS-WIRED-BURNABY | WIRED-BURNABY | MIS | No | ALWAYS | ADMIN | 09/13/18 03:47 PM EDT |
| MIS-WIRED-CONCORD | WIRED-CONCORD | MIS | No | ALWAYS | ADMIN | 09/13/18 03:47 PM EDT |
| MIS-WIRED-SUNNYVALE | WIRED-SUNNYVALE | MIS | No | ALWAYS | ADMIN | 09/13/18 03:47 PM EDT |
| R&D-WIRED-BURNABY | WIRED-BURNABY | R&D | No | ALWAYS | ADMIN | 09/13/18 03:48 PM EDT |
| R&D-WIRED-CONCORD | WIRED-CONCORD | R&D | No | ALWAYS | ADMIN | 09/13/18 03:49 PM EDT |
| R&D-WIRED-SUNNYVALE | WIRED-SUNNYVALE | R&D | No | ALWAYS | ADMIN | 09/13/18 03:49 PM EDT |

| RANK 332 | NAME 334 | NETWORK ACCESS CONFIGURATION 336 | USER/HOST PROFILE 338 | LAST MODIFIED BY 340 | LAST MODIFIED DATE 342 |
|---|---|---|---|---|---|
| 1 | MIS-WIRED-BURNABY | MIS-WIRED-BURNABY | MIS-WIRED-BURNABY | ADMIN | 09/13/18 03:57 PM EDT |
| 2 | MIS-WIRED-CONCORD | MIS-WIRED-CONCORD | MIS-WIRED-CONCORD | ADMIN | 09/13/18 03:57 PM EDT |
| 3 | MIS-WIRED-SUNNYVALE | MIS-WIRED-SUNNYVALE | MIS-WIRED-SUNNYVALE | ADMIN | 09/13/18 03:57 PM EDT |
| 4 | EMPLOYEE-WIRED-BURNABY | EMPLOYEE-WIRED-BURNABY | EMPLOYEE-WIRED-BURNABY | ADMIN | 09/13/18 03:57 PM EDT |
| 5 | EMPLOYEE-WIRED-CONCORD | EMPLOYEE-WIRED-CONCORD | EMPLOYEE-WIRED-CONCORD | ADMIN | 09/13/18 03:57 PM EDT |
| 6 | EMPLOYEE-WIRED-SUNNYVALE | EMPLOYEE-WIRED-SUNNYVALE | EMPLOYEE-WIRED-SUNNYVALE | ADMIN | 09/13/18 03:57 PM EDT |
| 7 | R&D-WIRED-BURNABY | R&D-WIRED-BURNABY | R&D-WIRED-BURNABY | ADMIN | 09/13/18 03:58 PM EDT |
| 8 | R&D-WIRED-CONCORD | R&D-WIRED-CONCORD | R&D-WIRED-CONCORD | ADMIN | 09/13/18 03:59 PM EDT |
| 9 | R&D-WIRED-SUNNYVALE | R&D-WIRED-SUNNYVALE | R&D-WIRED-SUNNYVALE | ADMIN | 09/13/18 04:02 PM EDT |

| NAME 362 | ACCESS VALUE/VLAN 364 | LAST MODIFIED BY 368 | LAST MODIFIED DATE 370 |
|---|---|---|---|
| EMPLOYEE-WIRED-BURNABY | 45 | ADMIN | 09/13/18 03:53 PM EDT |
| EMPLOYEE-WIRED-CONCORD | 75 | ADMIN | 09/13/18 03:53 PM EDT |
| EMPLOYEE-WIRED-SUNNYVALE | EMPLOYEE VLAN | ADMIN | 09/13/18 03:54 PM EDT |
| MIS-WIRED-BURNABY | 76 | ADMIN | 09/13/18 03:56 PM EDT |
| MIS-WIRED-CONCORD | 46 | ADMIN | 09/13/18 03:57 PM EDT |
| MIS-WIRED-SUNNYVALE | MIS_VLAN | ADMIN | 09/13/18 03:55 PM EDT |
| R&D-WIRED-BURNABY | 37 | ADMIN | 09/13/18 03:58 PM EDT |
| R&D-WIRED-CONCORD | 47 | ADMIN | 09/13/18 03:59 PM EDT |
| R&D-WIRED-SUNNYVALE | 97 | ADMIN | 09/13/18 04:00 PM EDT |

| GENERAL | | | |
|---|---|---|---|
| USER NAME | ADMIN | PASSWORD | ******* |
| ENABLE PASSWORD | | | |

| PROTOCOL | |
|---|---|
| TYPE | SSH 2 |

| VLAN ID | | | |
|---|---|---|---|
| DEFAULT | | DEAD END | |
| REGISTRATION | | QUARANTINE | 1000 |
| AUTHENTICATION | | VOICE | |

CLI CONFIGURATIONS

TYPE: ● NONE  ○ PORT BASED  ○ HOST BASED

[APPLY]  [RESET]

| GLOBAL | NAME | WHERE (LOCATION) | WHO/WHAT BY GROUP | WHO/WHAT BY ATTRIBUTE | WHEN | LAST MODIFIED BY | LAST MODIFIED DATE |
|---|---|---|---|---|---|---|---|
| | EMPLOYEE | ANY | EMPLOYEE | No | ALWAYS | ADMIN | 09/13/18 04:06 PM EDT |
| | MIS | ANY | MIS | No | ALWAYS | ADMIN | 09/13/18 04:06 PM EDT |
| | R&D | ANY | R&D | No | ALWAYS | ADMIN | 09/13/18 04:06 PM EDT |
| | SECURITY-RISK-ENDPOINT | ANY | ANY | YES | ALWAYS | ADMIN | 09/13/18 04:12 PM EDT |

| RANK | NAME | NETWORK ACCESS CONFIGURATION | USER/HOST PROFILE | LAST MODIFIED BY | LAST MODIFIED DATE |
|---|---|---|---|---|---|
| 1 | ISOLATE-SECURITY-RISK-ENDPOINTS | ISOLATE | ISOLATE | ADMIN | 09/13/18 04:13 PM EDT |
| 2 | MIS | MIS | MIS | ADMIN | 09/13/18 04:13 PM EDT |
| 3 | R&D | R&D | R&D | ADMIN | 09/13/18 04:13 PM EDT |
| 4 | EMPLOYEE | EMPLOYEE | EMPLOYEE | ADMIN | 09/13/18 04:13 PM EDT |

| NAME | LOGICAL NETWORK 464 | LAST MODIFIED BY | LAST MODIFIED DATE |
|---|---|---|---|
| EMPLOYEE | EMPLOYEE-PRODUCTION | ADMIN | 09/13/18 04:07 PM EDT |
| ISOLATION | ISOLATION | ADMIN | 09/13/18 04:13 PM EDT |
| MIS | MIS-PRODUCTION | ADMIN | 09/13/18 04:09 PM EDT |
| R&D | R&D NETWORK | ADMIN | 09/13/18 04:07 PM EDT |

GENERAL

USER NAME: ADMIN     PASSWORD: *******
ENABLE PASSWORD:

PROTOCOL

TYPE: SSH 2

LOGICAL NETWORK MAPPINGS

| NETWORK NAME | ACTION TYPE | VALUE |
|---|---|---|
| ISOLATION | SET PORT VLAN ID | 1000 |
|  | SET PORT ACL | INTERNET-ONLY-ACL |
| EMPLOYEE | SET PORT VLAN ID | 45 |
| MIS | SET FILTER ID | MIS ACCESS FILTER |
| R&D | SET PORT VLAN NAME | DEVELOPMENT |

APPLY     RESET

FIG. 4D

LOGICAL NETWORK ABSTRACTION FOR NETWORK ACCESS CONTROL

CROSS-REFERENCE TO RELATED APPLICATIONS

This application is a continuation of U.S. patent application Ser. No. 16/153,951 filed on Oct. 8, 2018, which claims the benefit of U.S. Provisional Application No. 62/738,923 filed on Sep. 28, 2018, both of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2018-2020, Fortinet, Inc.

BACKGROUND

Field

Embodiments of the present invention generally relate to network security. In particular, embodiments of the present invention relate to network access control (NAC) access policy definition and the associated configuration of access points to enforce the access policies based on a logical network abstraction that facilitates a more efficient and manageable representation of access policies.

Description of the Related Art

In a network communication system, a NAC device is used to implement access policies for controlling devices and user access to a network in order to increase network visibility and reduce risk. In the context of heterogeneous networks, having, for example, wired and wireless network devices from multiple networking equipment and network security device vendors, network access visibility and control becomes difficult to manage. This is because access points (e.g., the network devices at the edge of the network that provide an entry point into the network) from multiple entities and multiple media require different configuration, and insight into status of an endpoint or computing device connected to the endpoint via such access points may require detailed implementation-related knowledge such as virtual local area network (VLAN) identifications, VLAN names, and the like.

Due to the differences in hardware configurations across a typical heterogeneous network, current implementations of access configurations in NAC devices results in the definition of a large amount of access policies. In addition, in scenarios in which the policy implementer (e.g., an administrator of the NAC device) is a different user from the access point owner (e.g., an administrator of a particular portion of the network, such as a branch office network), the policy implementer requires intrinsic details of the access point configuration, which creates a tight knowledge coupling and limits changes to both sides. Furthermore, gradual NAC deployment is difficult since the policy implementer is required to make appropriate modifications as more network components and/or network segments are added to the network.

In view of the foregoing, there is a need in the art for technology that facilitates administration of NAC devices associated with heterogeneous networks by, for example, decoupling the intrinsic details of the configurations of various access points from the NAC access policy definition process and reducing the complexity and reducing the number of access policies required to be defined.

SUMMARY

Systems and methods are described for NAC access policy creation and reconfiguration of access points to enforce same. According to one embodiment, access policies are decoupled from underlying implementation details of access points associated with a private network by: (i) maintaining by a NAC device an access point model that maps logical networks to corresponding enforcement action implementations for the access points; and (ii) representing the access policies in a form of a current state of a particular endpoint device and an enforcement action specified with reference to a logical network. An attribute of an endpoint is received by the NAC device based upon which a matching access policy is identified. The corresponding enforcement action implementation for the access point to which the endpoint is connected is retrieved based on the logical network specified in the matching access policy. Finally, the access point is reconfigured to perform the enforcement action based on the retrieved enforcement action implementation.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 3A is a table illustrating exemplary user/host profiles without the use of logical networks for a particular scenario.

FIG. 3B is a table illustrating exemplary network access policies without the use of logical networks for the particular scenario.

FIG. 3C is a table illustrating exemplary network access configurations without the use of logical networks for the particular scenario.

FIG. 3D illustrates a screen of a graphical user interface for performing access point model configuration without the use of logical networks.

FIG. 4A is a table illustrating exemplary user/host profiles for the same scenario but with the use of logical networks in accordance with an embodiment of the present invention.

FIG. 4B is a table illustrating exemplary network access policies for the same scenario but with the use of logical networks in accordance with an embodiment of the present invention.

FIG. 4C is a table illustrating exemplary network access configurations for the same scenario but with the use of logical networks in accordance with an embodiment of the present invention.

FIG. 4D is a screen shot of an access point model configuration page for a NAC device with the use of logical networks in accordance with an embodiment of the present invention.

DETAILED DESCRIPTION

Figure 1:
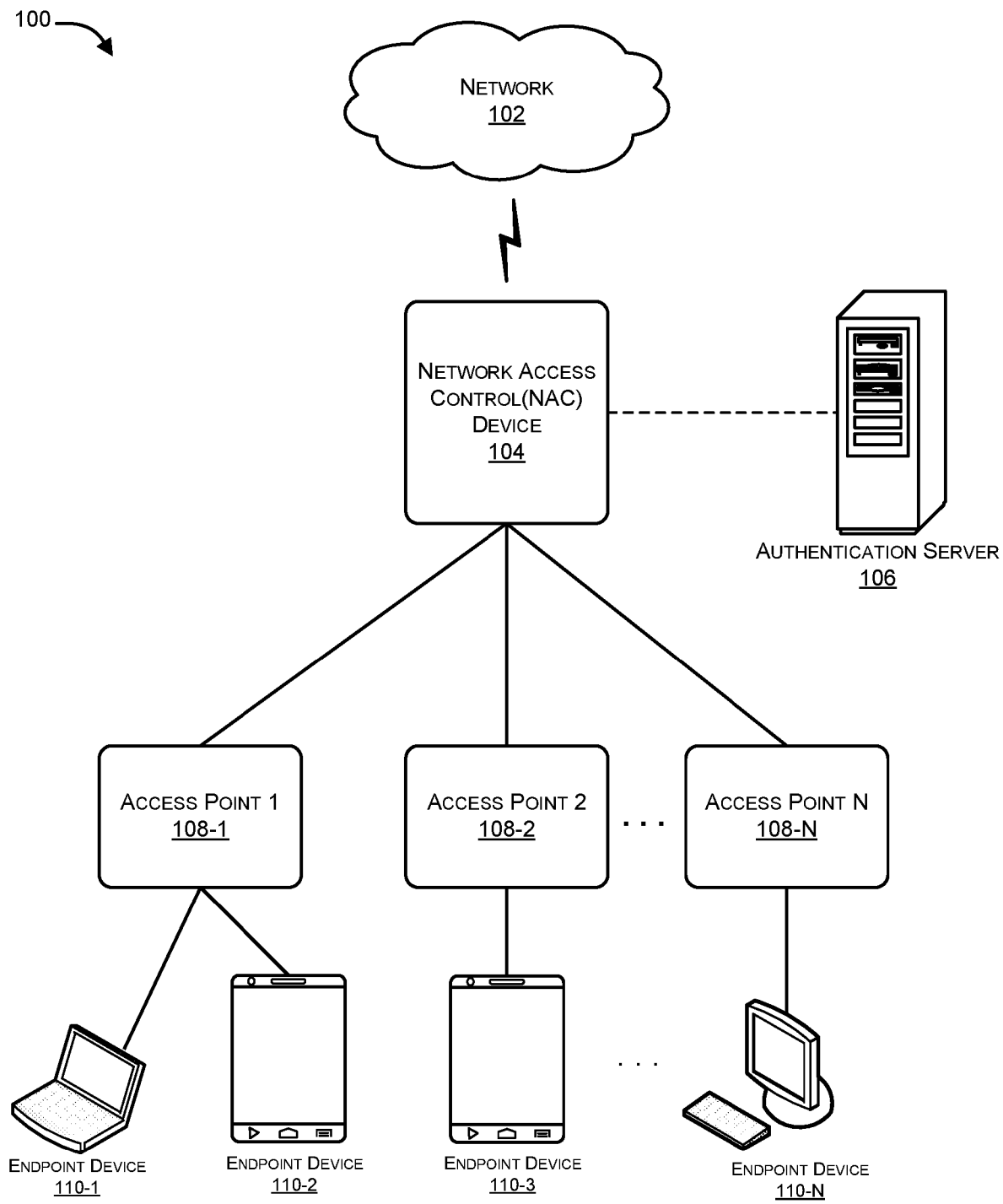
FIG. 1 illustrates a simplified network architecture in which aspects of the present invention can be implemented in accordance with an embodiment of the present invention.

Systems and methods are described for NAC access policy creation and reconfiguration of access points to enforce same. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrases "logical network" or "logical network abstraction" generally refer to an abstraction that facilitates decoupling of the process of creating a security policy (e.g., a NAC access policy) from the implementation details of the network device that enforces the security policy. Using logical networks, a NAC device administrator (also referred to herein as an access policy implementer) may specify access policies with reference to logical networks instead of specific access values, such as a VLAN ID or VLAN name. For example, instead of specifying an access policy in the form of "Users like Bob on Mobile Phones when connecting to wireless AP X is in VLAN A, but when connecting to wireless AP Y is in VLAN B", the access policy implementer can specify "End Users on Mobile Phones are on User-Production." This allows the implementation details of the logical network named User-Production on each access point to remain unknown to the access policy implementer and instead be defined for each access point by the respective access point administrator.

The phrase "access point" generally refers to a network device representing an entry point into a private network. Non-limiting examples of access points include edge network devices through which access to a private network may be obtained, switches, routers, network gateways, wireless access points and the like.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but are not limited to, simple packet forwarding, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The phrase "security device" generally refers to a hardware or virtual device or network appliance that provides security services to a private network, for example, providing one or more of data privacy, protection, encryption and security. A network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management, load balancing and traffic shaping—that can be deployed individually as a point solution or in various combinations as a unified threat management (UTM) solution. Non-limiting examples of network security devices include proxy servers, firewalls, VPN appliances, gateways, UTM appliances, NAC appliances/servers and the like.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

Systems and methods are described for NAC access policy creation and reconfiguration of access points to enforce same. In accordance with embodiments of the present an access point model and access policies are maintained by a NAC device. The access point model maps multiple logical networks to corresponding enforcement action implementations for each of multiple access points associated with a private network. The access policies specify a current state of a particular endpoint device and an enforcement action. The enforcement action may be specified with reference to a logical network of the multiple logical networks.

According to various embodiments of the present disclosure, logical networks abstract the implementation details of access points such that creating policies to control access can be performed using the logical networks instead of specific access values, such as VLAN IDs and/or VLAN names. For example, an access policy without the use of logical networks, such as "Users like Bob on Mobile Phones when connecting to wireless AP X is in VLAN A, but when connecting to wireless AP Y is in VLAN B", can be simplified to "End Users on Mobile Phones are on User-Production" with the use of logical networks and the implementation-details of the "User-Production" logical network on each access point can remain unknown to the access policy implementer. Thus, the logical network based approach for NAC access policy implementation eliminates the need for knowledge on the part of the access policy implementer regarding configuration details of all access points in the network.

FIG. 1 illustrates a simplified network architecture of a private network 100 in which aspects of the present invention can be implemented in accordance with an embodiment of the present invention. In the context of the present example, a NAC device 104 protecting private network 100 can create access policies and reconfigure access points 108-1, 108-2 . . . 108-N (which may be collectively referred to as access points 108 and may individually be referred to as access point 108, hereinafter). Access points 108 generally represent edge network devices or entry points to private network 100. Examples of access points include, but are not limited to a wired network switch, a router, a wireless controller (e.g., a controller of multiple wireless access points (APs) within a wireless network), a wireless AP (e.g., a Wi-Fi AP), a network gateway and the like. NAC device 104 can be communicatively coupled with a public network 102, such as the Internet, so that users can access network 102 using endpoint devices 110-1, 110-2 ... 110-N (which may be collectively referred to as endpoint devices 110 and may be individually referred to as endpoint device 110, hereinafter) through corresponding access points 108. Non-limiting examples of endpoint devices 110 include personal computers, smart devices, web-enabled devices, hand-held devices, laptops, smartphones and the like.

Those skilled in the art will appreciate that, private network 100 can include one or more wireless networks, one or more wired networks or a combination thereof that can be implemented as one of the different types of networks, such as an Intranet, Local Area Network (LAN), Wide Area Network (WAN), Internet, and the like. Further, the networks can either be dedicated networks or shared networks. The shared networks represent an association of the different types of networks that use a variety of protocols, for example, Hypertext Transfer Protocol (HTTP), Transmission Control Protocol/Internet Protocol (TCP/IP), Wireless Application Protocol (WAP), and the like.

Those skilled in the art will appreciate that while embodiments of the present disclosure are explained with reference to NAC device 104, logical networks have broader applicability and may be used in other network devices, network security devices or computing devices.

According to an aspect, NAC device 104 can receive an access request from an endpoint device 110 through a corresponding access point 108. In response to the request, NAC device 104 can receive one or more attributes of endpoint device 110. The attributes of end point device can be obtained from any or combination of information of a user associated with endpoint device 110, information of endpoint device 110, information of access point associated 108 with the endpoint device 110, and the like. In one embodiment and as described in more detail below, NAC device 104 can proxy authentication requests received from endpoint devices 110 to an authentication server 106 so as to allow NAC device 104 to receive attributes of endpoint device 100 after a valid authentication of endpoint device 110 has been made by authentication server 106.

As described further below with reference to FIG. 2, an enforcement engine running on the NAC device can maintain an access point model that maps each of multiple logical networks to corresponding access values that are indicative of an enforcement action implementations for each access point 108. Further, enforcement engine can maintain multiple access policies defined by a policy implementer in which each access policy specifies a current state of a particular endpoint device 110 and an enforcement action with reference to a logical network.

According to an aspect, on receiving attributes of endpoint device 110, the enforcement engine can identify a matching access policy based on attributes of endpoint device 110. Further, the enforcement engine can retrieve the corresponding enforcement action implementation for the access point 108 through which the endpoint device 110 is connected to private network 100 from the access point model based on the logical network specified in the matching access policy to reconfigure the access point 108 to perform the enforcement action.

Figure 2:
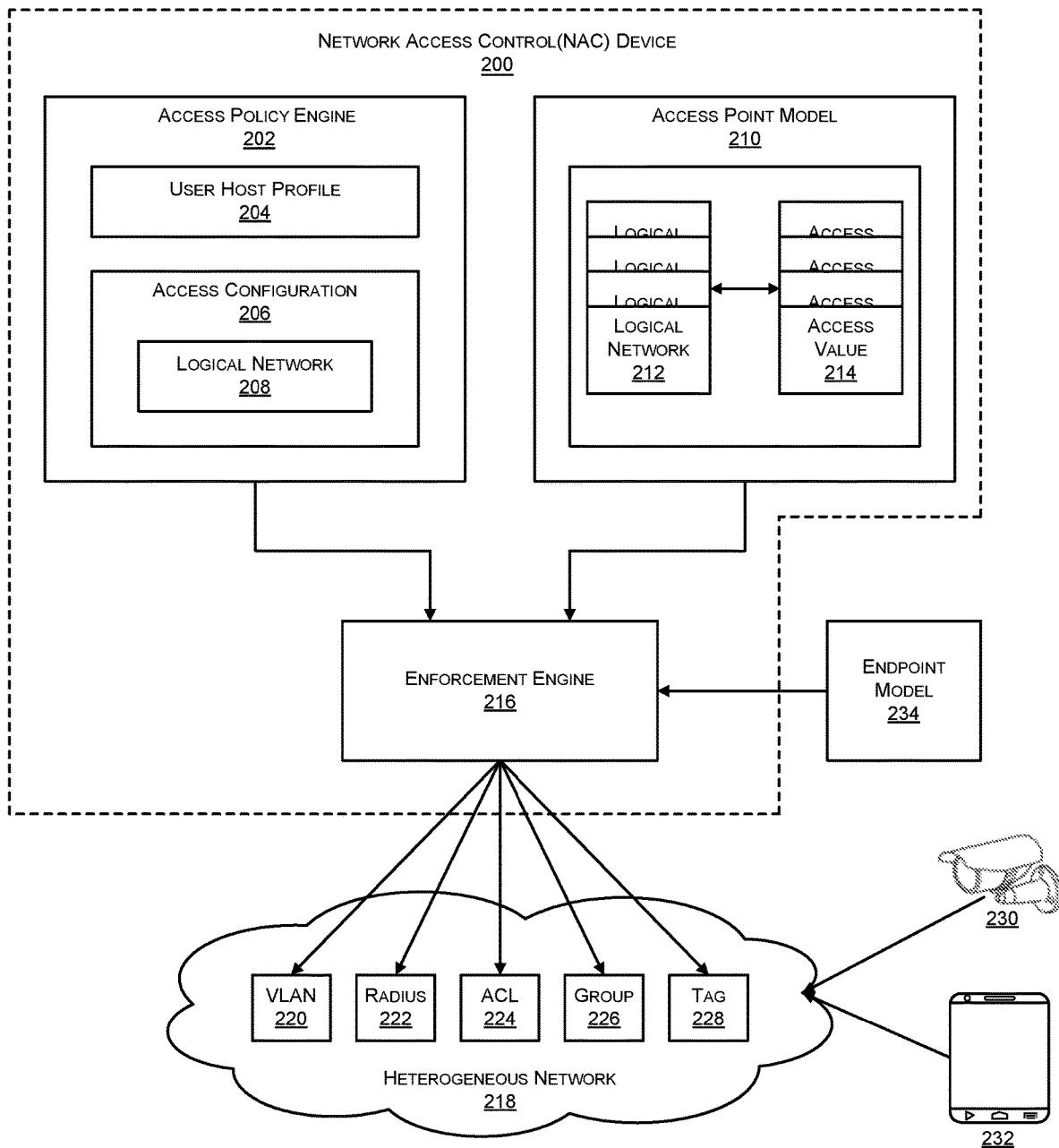
FIG. 2 illustrates exemplary functional units of a network access control (NAC) device in accordance with an embodiment of the present invention.

FIG. 2 illustrates exemplary functional units of a NAC device 200 in accordance with an embodiment of the present invention. In the context of the present example, NAC device 200 includes an enforcement engine 216, an access policy engine 202 and an access point model 210.

Access point model 210 declares the implementation of logical networks for each specific access point, for example, by mapping each of multiple logical networks 212 with corresponding access values 214 that are indicative of an enforcement action implementation for each of multiple access points associated with the private network at issue (e.g., heterogeneous network 218). According to one embodiment, each logical network may have corresponding access values (e.g. VLAN IDs, VLAN aliases, VLAN names, Vendor-specific group identifiers, etc.) specified by access point model 210.

Access policy engine 202 maintains and provides access to a user host profile 204 and an access configuration 206. User host profile 202 can include user information along with endpoint device information of each user, user group and/or host. As described further below, network access policies represented within access configuration 206 each specify a current state of a particular endpoint device and an associated enforcement action with reference to a logical network 208.

In an implementation, access points that share implementations can be configured collectively to save time. For example, one or more access points having at least one common parameter, e.g., multiple network switches using the same VLAN ID, can be grouped together. Using access configuration 206 of an access policy and access point model 210, enforcement engine 216 can dynamically reconfigure an access point to enforce access.

Enforcement engine 216 may facilitate access to access policy engine 202 via a graphical user interface (not shown) of NAC device 200 to allow a policy implementer to create/edit/modify/delete user/host profiles, network access policies and network access configurations. Enforcement engine 216 may also facilitate access to access point model 210 to allow access point owners (which may be the same or different users than the policy implementer) to define for their respective access points implementation-details of access points for each of the logical networks. As described in further detail below, when handling an access request (e.g., a connection to a particular port of a wired access point or an attempt to connect to a Service Set Identifier (SSID) associated with a wireless access point) from an endpoint (e.g., smart camera 230 or mobile phone 232), enforcement engine 216 makes use of both access policy engine 202 and access point model 210 to identify a matching network access policy corresponding to the access request and obtain the appropriate enforcement actions so as to allow enforcement engine 216 to reconfigure the access point accordingly. For example, the access value 214 corresponding to logical network 208 can be determined and retrieved from access point model 210 based on the mapping of logical networks 212 to access values 214 maintained by access point model 210. Based on the determined access value, enforcement engine 216 can then reconfigure the access point through which the endpoint is attempting to access the private network to cause the access point to perform the enforcement action based on the retrieved corresponding access value, which is indicative of the implementation details for the enforcement action on the access point. In the context of the present example, the implementation details of the enforcement actions can be specified with reference to one or more of a VLAN 220, a Remote Authentication Dial-In User Service (RADIUS) Access Response 222, an Access Control List (ACL) 224, a Group 226 or a Tag 228.

According to an aspect, in response to receipt of an access request from/associated with an endpoint device (e.g., smart camera 230 or mobile phone 232) by an access point, enforcement engine 216 can receive one or more attributes of the endpoint device through an endpoint model 234. In order to provide the attributes the endpoint model 234 can store any or a combination of information of a user associated with the endpoint device, information of the endpoint device, information of the access point associated with the endpoint device, and the like. In an implementation, enforcement engine 216 can receive the attributes of the endpoint device after valid authentication of the endpoint device by an authentication server.

For purposes of illustration, concrete examples are described below—both without the use of logical networks (FIGS. 3A-D) and with the use of logical networks (FIGS. 4A-D)—with reference to implementation of a network access policy for a scenario in which different users in three departments are to be granted separate levels of access to a private network. In the context of this example, the private network is an enterprise network distributed across three office locations (i.e., Burnaby, Concord and Sunnyvale) and three user groups (i.e., employees associated with management information systems (MIS), employees associated with Research and Development (R&D) and other employees associated with neither MIS nor R&D). Each location is assumed to require slightly different configuration, for example, different VLAN IDs, an ACL applied, etc. Additionally, an isolation network is to be configured.

FIG. 3A is a table 300 illustrating exemplary user/host profiles without the use of logical networks for a scenario in which network access policies are to be created for users in three departments are to be granted separate levels of access to a private network. User/host profiles represent a set of constraints to narrow the set of any endpoint (host) connected to any access point at any time to a subset of endpoints (hosts), access points, and times. Table 300 includes a name column 302, a where (location) column 304, a who/what by group column 306, a who/what by attribute column 308, a when column 310, a last modified by column 312 and a last modified date column 314. Each row in table 300 represents a user/host profile. While a profile can sometimes be reused, those skilled in the art will appreciate in practice it tends to be just as hard to keep track. As such, in the context of the present example, there is a profile for each network access policy that is to be created.

Name column 302 includes a descriptive name of the user/host profile for the policy implementer's use.

Where (location) column 304 includes a set of groups of access points or subsets of access points (e.g., switch ports, SSID) representing the network topology location in which the user/host profile applies.

Who/what by group column 306 includes a set of groups of User- or Endpoint-models for which the user/host profile applies.

Who/what by attribute column 308 includes a set of parameters further limiting the user/host profile by non-group user or host model attributes.

When column 310 includes a time component which can be "always" meaning at all times or a specific time period on specific days of the week in a calendar system (e.g., Gregorian Calendar). Any time specified limits the matching of the user/host profile to the configured time and days.

Last modified by column 312 includes accounting information to track configuration changes to the user/host profiles, in this case tracking the policy implementer.

Last modified date column 314 includes accounting information to track configuration changes to the user/host profiles, in this case tracking the date and time of the last change.

FIG. 3B is a table 330 illustrating exemplary network access policies without the use of logical networks for the scenario described with reference to FIG. 3A. Table 330 includes a rank column 332, a name column 334, a network access configuration column 336, a user/host profile column 338, a last modified by column 340, and a last modified date column 342. Each row in table 330 represents a network access policy.

Rank column 332 identifies the rank of the network access policy. According to one embodiment, network access policies are evaluated from lowest to highest rank, and the first policy with a matching user/host profile is used by the enforcement engine.

Name column 334 includes a descriptive name of the network access policy for the policy implementer's use.

Network access configuration column 336 specifies the network access configuration of FIG. 3C for each network access policy.

User/host profile column 338 specifies the user/host profile of FIG. 3A for each network access policy.

Last modified by column 340 identifies the user that last modified the network access policy.

Last modified date column 342 provides a time stamp indicating the time/date at which the network access policy was last modified.

FIG. 3D illustrates a screen 380 of a graphical user interface for performing access point model configuration without the use of logical networks. Screen 380 represents a screen that might be displayed to the policy implementer responsive to creation/modification of a network access configuration. In the context of the present example, the policy implementer is required to apply the four VLAN states (e.g., isolation, employee, MIS or R&D) to hosts. As noted above and illustrated by the present example, the policy implementer requires intrinsic details of access point configurations, which creates a tight coupling and limits changes to both sides.

FIG. 4A is a table 400 illustrating exemplary user/host profiles for the same scenario but with the use of logical networks in accordance with an embodiment of the present invention. As those skilled in the art will appreciate with reference to FIGS. 4A-C, removing information regarding the enforcement action implementation details (e.g., access values, such as VLAN IDs, VLAN names and the like) for every possible access point from the specification of network access configurations (FIG. 4C) facilitates a significant reduction in the number of user/host profiles (FIG. 4A), network access policies (FIG. 4B) and network access configurations (FIG. 4C).

As illustrated in FIG. 4A, for the same scenario described with reference to FIGS. 3A-C in which different users in three departments are to be granted separate levels of access to a private network, the number of user/host profiles has been reduced from nine to four, while also including a profile for hosts that are required to be isolated.

Similarly, as illustrated by FIG. 4B, for the same scenario described with reference to FIGS. 3A-C, the number of network access policies in table 430 needed to support the various levels of access is reduced from nine to four.

FIG. 4C is a table 460 illustrating exemplary network access configurations for the same scenario but with the use of logical networks in accordance with an embodiment of the present invention. In the context of the present example, table 460 replaces access value/VLAN column 364 of FIG. 3C with a logical network column 464. Logical network column 464 specifies the logical network (i.e., Employee-Production, Isolation, MIS-Production or R&D Network) applicable to each network access configuration. Because there are only four logical networks, only four network access configurations are required in this example. The implementation details for the logical networks are encapsulated within an access point model (e.g., access point model 210), which can be configured by the owner of the access points (e.g., the network administrator(s) having specific knowledge regarding configuration of the access points) via an access point model configuration page such as that illustrated in FIG. 4D.

FIG. 4D is a screen shot of an access point model configuration page for a NAC device with the use of logical networks in accordance with an embodiment of the present invention. In the context of the present example, logical network details are defined per device. Thus, instead forcing onto the policy implementer the fixed concept of applying four VLAN states (i.e., Isolation, Employee, MIS and R&D) to hosts as illustrated with reference to FIG. 3D, access point owners are tasked with defining what each logical network means for each of the access points they manage. In this manner, the implementation details for various enforcement actions are pushed down to the person having such knowledge, thereby reducing the exposure of unnecessary details to the policy implementer while at the same time reducing the number of network access policies and simplifying the process of defining network access policies.

In the present example, the "Action Type" drop down option list includes all the enforcement actions the NAC device can perform on the specific device, so not all actions would be available for each device. Note also, multiple enforcement actions can be defined per logical network. For example, in the present example, placing an endpoint into the Isolation network includes both setting the port VLAN ID to 1000 and setting the port ACL to an Internet-only-ACL to limit the endpoint to communications with the external network.

Those skilled in the art will appreciate that without the logical network based approach, the policy implementer is required to have or otherwise obtain knowledge regarding configuration details of all access points of the network, which can cause needless delays in NAC implementation. Embodiments herein utilize logical network based approach for NAC implementation, which eliminates the need for such knowledge of configuration details of all access points by the NAC policy implementer. Further, gradual NAC deployment is also improved since the policy implementation does not necessarily requires changes responsive to addition of access points or physical network segments to the NAC device. Rather, the changes can be limited to the specific device or class of device instead of disrupting endpoints already under enforcement. Furthermore, visibility for users, such as those at a support helpdesk, is improved because an ability to quickly analyze a logical network in which an endpoint device is located without translating from a VLAN ID may reduce time spent during troubleshooting. Also, configuring both a logical network and a raw access value such as a VLAN ID provides enough information for both endpoint and access point centric visibility.

Figure 5A:
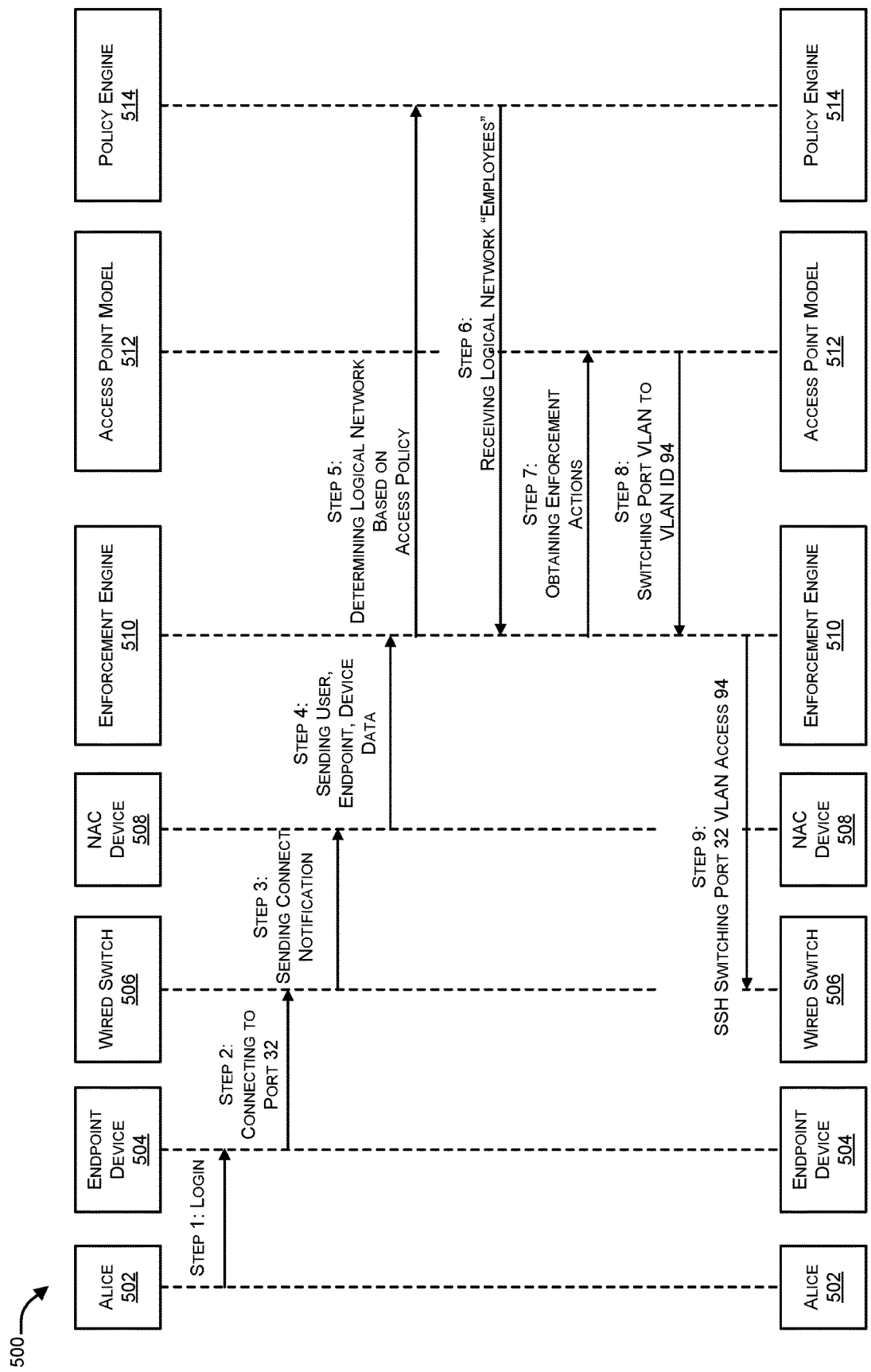
FIGS. 5A-B are sequence diagrams illustrating connection scenarios for wired and wireless access in accordance with an embodiment of the present invention.

FIG. 5A is a sequence diagram 500 illustrating a wired connection scenario in accordance with an embodiment of the present invention. In the context of the present example, at step 1, a user, Alice 502 logs in to an endpoint device 504 that is coupled to a wired switch 506. At step 2, endpoint device 502 makes an access request, connecting to Port 32. At step 3, the connection notification is sent to NAC device 508. At step 4, enforcement engine 510 of NAC device 508 can receive user information, endpoint information and device information for determining one or more attributes of endpoint device 504. At step 5, enforcement engine 510 can identify matching access policy from policy engine 514 and retrieve logical network from the matched access policy. At step 6, enforcement engine 510 can receive the logical network, for example, "Employees". Further, at step 7, enforcement engine 510 can retrieve the corresponding enforcement action implementation(s) for the access point, i.e., wired switch 506. At step 8, enforcement action implementation, e.g., for setting a port VLAN ID to a particular value for wired switch 506, can be received by enforcement engine 510 so that at step 9, enforcement engine 510 can reconfigure wired switch 506 by causing wired switch 506 to set the port VLAN ID of port 32 to VLAN ID 94.

Figure 5B:
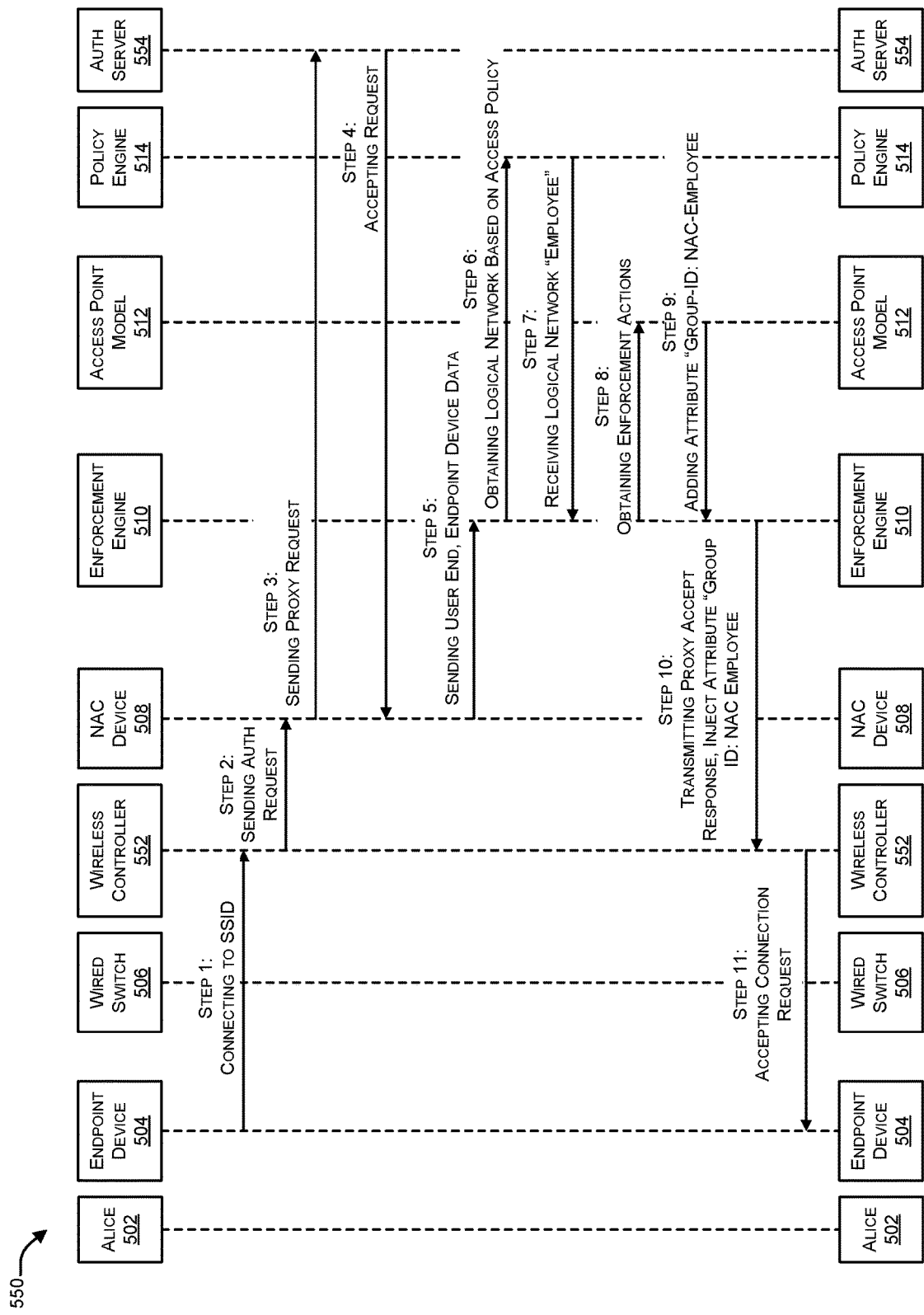

FIG. 5B illustrates an exemplary process for reconfiguring an access point after a valid authentication by authentication server. In the context of the present example, at step 1, endpoint device 504 can make an access request for connecting to Service Set Identifier (SSID). At step 2, an authentication request can be sent to NAC device 508. At step 3, a proxy request can be sent to authentication server 554 so that authentication server 554 can authenticate endpoint device 504 using proxy request. At step 4, after valid authentication NAC device 508 can accept connection request. At step 5, enforcement engine 510 of NAC device 508 can receive user information, endpoint information and device information for determining one or more attributes of endpoint device 504. At step 6, enforcement engine 510 can identify matching access policy from policy engine 514 and retrieve logical network from the matched access policy. At step 7, enforcement engine 510 can receive the logical network, for example, "Employees". Further, at step 8, enforcement engine 510 can retrieve the corresponding enforcement action implementation for the access point i.e. wired switch 506. At step 8, enforcement action implementation, e.g., adding attribute "Group-ID: NAC Employee" can be received by enforcement engine 510 so that at step 10, enforcement engine 510 can reconfigure wireless controller 552 to transmit proxy accept response and inject "Group-ID: NAC Employee". At step 11, a notification indicating accepting connection request can be sent to endpoint device 504.

While in the context of FIG. 5A and FIG. 5B events relating to an endpoint device are described with reference to specific examples of an unauthenticated access and an authentication-oriented access (e.g., Wireless with RADIUS authentication of some kind), respectively, are described. Those skilled in the art will appreciate the unauthenticated access scenario can be generalized to include NAC device 508 responding to other stimulus, including, but not limited to Simple Network Management Protocol (SNMP) or syslog notifications, command-line interface (CLI)-based changes or even polling to reconfigure the access point for the endpoint. Similarly, in the context of authentication-oriented access, NAC processing performed by NAC device 508 is not limited to being triggered responsive to observation of an Access-Accept packet originated by authentication server 554. For example, NAC processing may be triggered by dynamic modifications made to the session of endpoint device 504, for example, via a RADIUS Change of Authorization message or the like.

Figure 6:
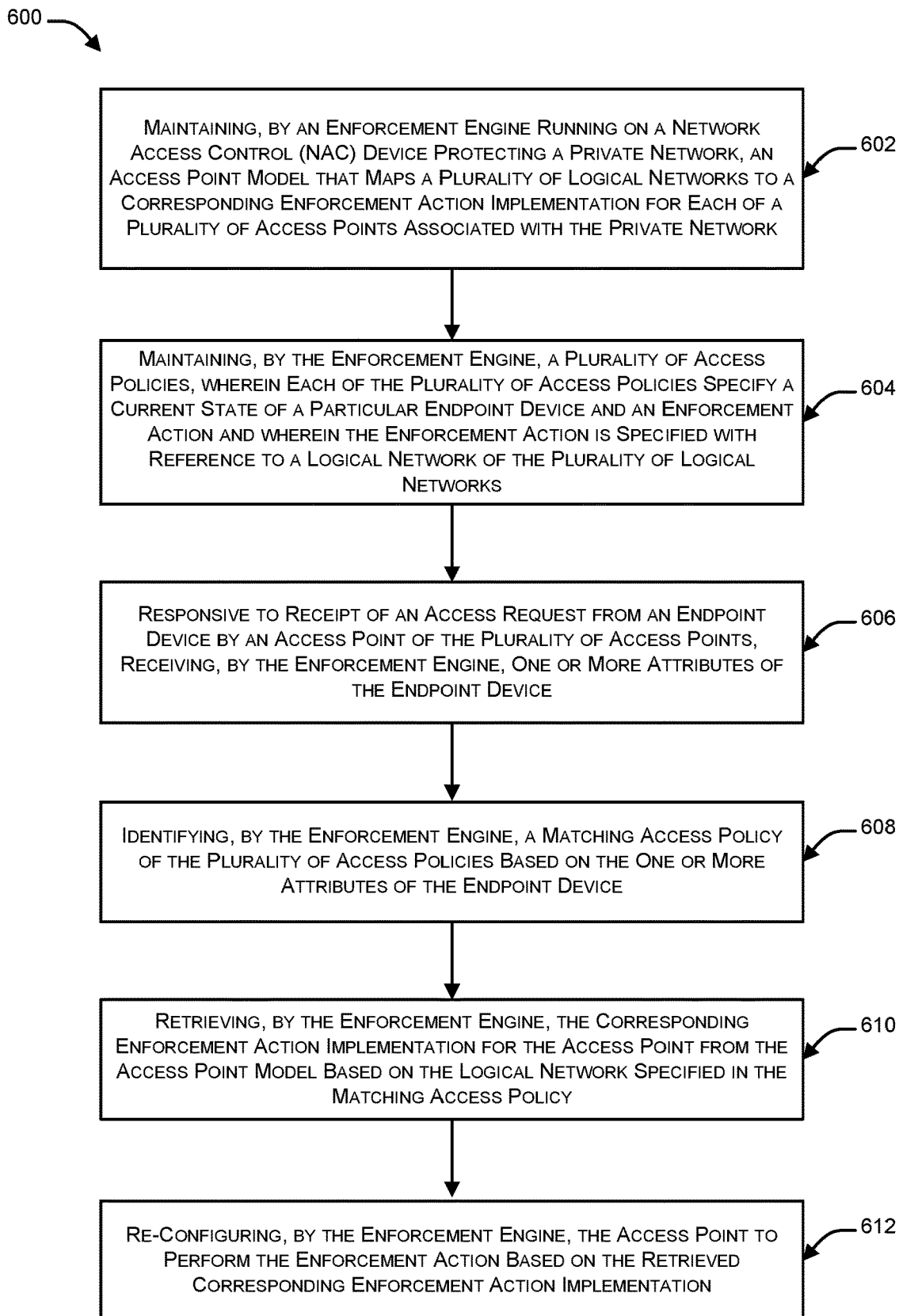
FIG. 6 is a high-level flow diagram illustrating a process for enforcing an action for controlling network access in accordance with an embodiment of the present invention.

FIG. 6 is a high-level flow diagram illustrating a process for enforcing an action for controlling network access in accordance with an embodiment of the present invention. In the context of the present example, at block 602, an enforcement engine running on a network access control (NAC) device protecting a private network can maintain an access point model, which can map a plurality of logical networks to a corresponding enforcement action implementation for each of a plurality of access points associated with the private network.

At block 604, the enforcement engine can maintain a plurality of access policies such that each access policy can specify a current state of a particular endpoint device and an enforcement action. The enforcement action can be specified with reference to a logical network of the plurality of logical networks.

At block 606, in response to receipt of an access request from an endpoint device by an access point of the plurality of access points, the enforcement engine can receive one or more attributes of the endpoint device so that at block 608 the enforcement engine can identify a matching access policy from the plurality of access policies based on the one or more attributes of the endpoint device.

At block 610, the enforcement engine can retrieve corresponding enforcement action implementation for the access point from the access point model based on the logical network specified in the matching access policy so that at block 612 the enforcement engine can reconfigure the access point to perform the enforcement action based on the retrieved corresponding enforcement action implementation.

Embodiments of the present disclosure include various steps, which have been described above. A variety of these steps may be performed by hardware components or may be embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

Figure 7:
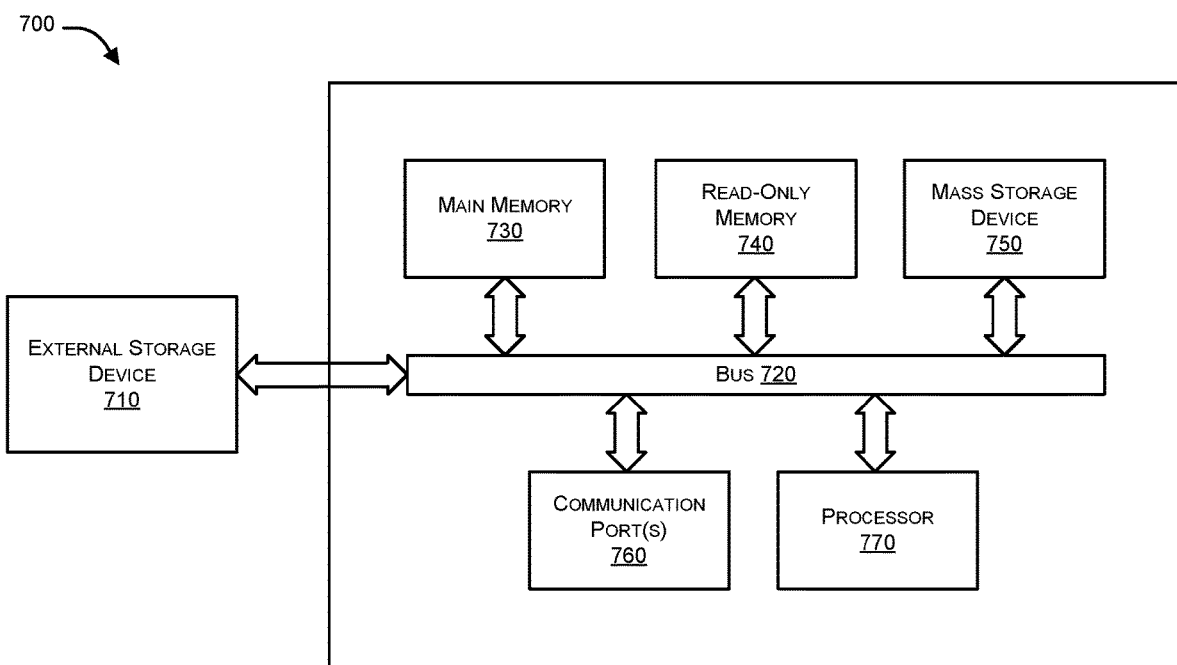
FIG. 7 illustrates an exemplary computer system in which or with which embodiments of the present invention may be utilized.

FIG. 7 illustrates an exemplary computer system 700 in which or with which embodiments of the present invention may be utilized. Computer system 700 may represent a portion of a NAC device or system 102.

As shown in FIG. 7, computer system 700, includes an external storage device 710, a bus 720, a main memory 730, a read only memory 740, a mass storage device 750, a communication port 760, and a processor 770.

Those skilled in the art will appreciate that computer system 700 may include more than one processor 770 and communication ports 760. Examples of processor 770 include, but are not limited to, an Intel® Itanium® or Itanium 2 processor(s), or AMD® Opteron® or Athlon MP® processor(s), Motorola® lines of processors, Forti-SOC™ system on a chip processors or other future processors. Processor 770 may include various modules associated with embodiments of the present invention.

Communication port 760 can be any of an RS-232 port for use with a modem based dialup connection, a 10/100 Ethernet port, a Gigabit or 10 Gigabit port using copper or fiber, a serial port, a parallel port, or other existing or future ports. Communication port 760 may be chosen depending on a network, such a Local Area Network (LAN), Wide Area Network (WAN), or any network to which computer system connects.

Memory 730 can be Random Access Memory (RAM), or any other dynamic storage device commonly known in the art. Read only memory 740 can be any static storage device(s) e.g., but not limited to, a Programmable Read Only Memory (PROM) chips for storing static information e.g. start-up or BIOS instructions for processor 770.

Mass storage 750 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 720 communicatively couples processor(s) 770 with the other memory, storage and communication blocks. Bus 720 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 770 to software system.

Optionally, operator and administrative interfaces, e.g. a display, keyboard, and a cursor control device, may also be coupled to bus 720 to support direct operator interaction with computer system. Other operator and administrative interfaces can be provided through network connections connected through communication port 760. External storage device 710 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM). Components described above are meant only to exemplify various possibilities. In no way should the aforementioned exemplary computer system limit the scope of the present disclosure.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method performed by one or more processors of a network access (NAC) device, the method comprising:
   decoupling a plurality of access points associated with a private network by:
      maintaining an access point model that maps a plurality of logical networks to a corresponding enforcement action implementation for each of the plurality of access points, wherein each logical network of the plurality of logical networks represents an abstraction that facilitates a process of creating one or more of the plurality of access policies without requiring knowledge of the underlying implementation details of the plurality of access points that are encapsulated within the access point model; and
      representing the plurality of access policies in a form of a current state of a particular endpoint device and an enforcement action specified with reference to a logical network of the plurality of logical networks;
   responsive to an event relating to an endpoint device connected to an access point of the plurality of access points, receiving one or more attributes of the endpoint device;
   identifying a matching access policy of the plurality of access policies based on the one or more attributes of the endpoint device;
   retrieving the corresponding enforcement action implementation for the access point from the access point model based on the logical network specified in the matching access policy; and
   reconfiguring the access point to perform the enforcement action based on the retrieved corresponding enforcement action implementation.

2. The method of claim 1, wherein the event comprises an attempt by the endpoint device to perform an unauthenticated access to the private network.

3. The method of claim 1, wherein the event comprises an attempt by the endpoint device to perform an authentication-oriented access to the private network.

4. The method of claim 3, wherein the one or more attributes of the endpoint device are received after valid authentication of the endpoint device by an authentication server.

5. The method of claim 1, wherein one or more access points of the plurality of access points having at least one common parameter are grouped in a single logical network of the plurality logical networks.

6. The method of claim 1, wherein the access point model indicates an enforcement action implementation for each of the plurality of access points by mapping an access value against each of the plurality of logical networks.

7. The method of claim 6, wherein said access value includes any or a combination of a Virtual Local Area Network (VLAN) identifier, a VLAN alias, a VLAN name, and a group identifier.

8. The method of claim 1, wherein the plurality of access policies are ranked by associating ranking information with the plurality of access policies and wherein said identifying, by the enforcement engine, a matching access policy is prioritized in accordance with the ranking information.

9. The method of claim 1, wherein the one or more attributes of the endpoint device are obtained from an end point model operatively coupled with the endpoint device.

10. The method of claim 1, wherein the one or more attributes of the endpoint device are obtained from any or a combination of information of a user associated with the endpoint device, information of the endpoint device and information of the access point associated with the endpoint device.

11. The method of claim 1, wherein the current state includes at least information regarding a location of the particular endpoint device.

12. The method of claim 11, wherein the information regarding a location of the particular endpoint device is indicative of an office associated with the private network.

13. A network access control (NAC) device comprising:
   a processing resource; and
   a non-transitory computer-readable medium, coupled to the processing resource, having stored therein instructions that when executed by the processing resource cause the processing resource to:
   decouple a plurality of access policies from underlying implementation details of a plurality of access points associated with a private network by:
      maintaining an access point model that maps a plurality of logical networks to a corresponding enforcement action implementation for each of the plurality of access points, wherein each logical network of the plurality of logical networks represents an abstraction that facilitates a process of creating one or more of the plurality of access policies without requiring knowledge of the underlying implementation details of the plurality of access points that are encapsulated within the access point model; and
      representing the plurality of access policies in a form of a current state of a particular endpoint device and an enforcement action specified with reference to a logical network of the plurality of logical networks;
   responsive to an event relating to an endpoint device connected to an access point of the plurality of access points, receive one or more attributes of the endpoint device;
   identify a matching access policy of the plurality of access policies based on the one or more attributes of the endpoint device;
   retrieve the corresponding enforcement action implementation for the access point from the access point model based on the logical network specified in the matching access policy; and
   reconfigure the access point to perform the enforcement action based on the retrieved corresponding enforcement action implementation.

14. The NAC device of claim 13, wherein the event comprises an attempt by the endpoint device to perform an unauthenticated access to the private network.

15. The NAC device of claim 13, wherein the event comprises an attempt by the endpoint device to perform an authentication-oriented access to the private network.

16. The NAC device of claim 15, wherein the one or more attributes of the endpoint device are received after valid authentication of the endpoint device by an authentication server.

17. The NAC device of claim 13, wherein one or more access points of the plurality of access points having at least one common parameter are grouped in a single logical network of the plurality logical networks.

18. The NAC device of claim 1, wherein the access point model indicates an enforcement action implementation for each of the plurality of access points by mapping an access value against each of the plurality of logical networks.

19. The NAC device of claim 18, wherein said access value includes any or a combination of a Virtual Local Area Network (VLAN) identifier, a VLAN alias, a VLAN name, and a group identifier.

20. The NAC device of claim 13, wherein the plurality of access policies are ranked by associating ranking information with the plurality of access policies and wherein identification of the matching access policy includes prioritizing the plurality of access policies in accordance with the ranking information.

21. The NAC device of claim 13, wherein the one or more attributes of the endpoint device are obtained from an end point model operatively coupled with the endpoint device.

22. The NAC device of claim 13, wherein the one or more attributes of the endpoint device are obtained from any or a combination of information of a user associated with the endpoint device, information of the endpoint device and information of the access point associated with the endpoint device.

23. The NAC device of claim 13, wherein the current state includes at least information regarding a location of the particular endpoint device.

24. The NAC device of claim 23, wherein the information regarding a location of the particular endpoint device is indicative of an office associated with the private network.

25. A non-transitory computer-readable storage medium embodying a set of instructions, which when executed by one or more processors of a network access control (NAC) device protecting a private network, causes the one or more processors to perform a method comprising:
   decoupling a plurality of access policies from underlying implementation details of a plurality of access points associated with the private network by:
      maintaining an access point model that maps a plurality of logical networks to a corresponding enforcement action implementation for each of the plurality of access points, wherein each logical network of the plurality of logical networks represents an abstraction that facilitates a process of creating one or more of the plurality of access policies without requiring knowledge of the underlying implementation details of the plurality of access points that are encapsulated within the access point model; and
      representing the plurality of access policies in a form of a current state of a particular endpoint device and an enforcement action specified with reference to a logical network of the plurality of logical networks;
   responsive to an event relating to an endpoint device connected to an access point of the plurality of access points, receiving one or more attributes of the endpoint device;
   identifying a matching access policy of the plurality of access policies based on the one or more attributes of the endpoint device;
   retrieving the corresponding enforcement action implementation for the access point from the access point model based on the logical network specified in the matching access policy; and
   reconfiguring the access point to perform the enforcement action based on the retrieved corresponding enforcement action implementation.

26. The non-transitory computer-readable storage medium of claim 25, wherein one or more access points of the plurality of access points having at least one common parameter are grouped in a single logical network of the plurality logical networks.

27. The non-transitory computer-readable storage medium of claim 25, wherein the access point model indicates an enforcement action implementation for each of the plurality of access points by mapping an access value against each of the plurality of logical networks.

28. The non-transitory computer-readable storage medium 27, wherein said access value includes any or a combination of a Virtual Local Area Network (VLAN) identifier, a VLAN alias, a VLAN name, and a group identifier.

29. The non-transitory computer-readable storage medium of claim 25, wherein the current state includes at least information regarding a location of the particular endpoint device.

30. The non-transitory computer-readable storage medium of claim 29, wherein the information regarding a location of the particular endpoint device is indicative of an office associated with the private network.

* * * * *

UNITED STATES PATENT AND TRADEMARK OFFICE
CERTIFICATE OF CORRECTION

PATENT NO. : 10,873,607 B1  Page 1 of 1
APPLICATION NO. : 16/902791
DATED : December 22, 2020
INVENTOR(S) : Trimbly It is certified that error appears in the above-identified patent and that said Letters Patent is hereby corrected as shown below:

In the Claims

In Column 15, Line 14, insert -- access policies from underlying implementation details of a plurality of -- after "decoupling a plurality of" and before "access points associated with".

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*